US010447069B2

United States Patent
Kinoshita (10) Patent No.: US 10,447,069 B2
(45) Date of Patent: Oct. 15, 2019

(54) VEHICLE POWER SOURCE

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/591,545

(22) Filed: May 10, 2017

(65) Prior Publication Data

US 2017/0341528 A1 Nov. 30, 2017

(30) Foreign Application Priority Data

May 25, 2016 (JP) .................... 2016-104502

(51) Int. Cl.
| | | |
|---|---|---|
| *H02J 7/14* | (2006.01) | |
| *H02P 3/14* | (2006.01) | |
| *F02N 11/08* | (2006.01) | |
| *B60L 50/52* | (2019.01) | |
| *B60L 58/20* | (2019.01) | |

(Continued)

(52) U.S. Cl.
CPC ............ *H02J 7/1423* (2013.01); *B60L 50/52* (2019.02); *B60L 58/20* (2019.02); *F02N 11/0866* (2013.01); *H02P 3/14* (2013.01); *B60L 58/12* (2019.02); *B60R 16/03* (2013.01); *F02N 11/04* (2013.01); *F02N 11/087* (2013.01); *F02N 11/0814* (2013.01); *F02N 2250/02* (2013.01); *F02N 2300/2002* (2013.01)

(58) Field of Classification Search
None
See application file for complete search history.

(56) References Cited

U.S. PATENT DOCUMENTS 5,488,283 A * 1/1996 Dougherty .......... B60L 11/1855
307/10.1
9,650,000 B2 * 5/2017 Decoster ................. B60R 16/03
(Continued)

FOREIGN PATENT DOCUMENTS

| JP | 2006-112386 A | 4/2006 |
|---|---|---|
| JP | 2011-162112 A | 8/2011 |
| JP | 2014-036557 A | 2/2014 |

OTHER PUBLICATIONS

Office Action issued in corresponding Japanese Patent Application No. 2016-104502, dated Feb. 27, 2018.

*Primary Examiner* — Daniel J Cavallari
(74) *Attorney, Agent, or Firm* — McDermott Will & Emery LLP (57) ABSTRACT

A vehicle power source includes a generator motor coupled to an engine, a first power storage, a second power storage, a conduction switch, and a switch controller. The first and the second power storages are coupled, in parallel, to the generator motor. The conduction switch is subject to change between a conductive state and a cut-off state of the generator motor and the second power storage. The switch controller changes the conduction switch from the conductive state to the cut-off state, on a condition that the generator motor is controlled in a powered state. The switch controller changes the conduction switch from the cut-off state to the conductive state, on a condition that the second power storage discharges in excess of a threshold, with the conductive switch changed to the cut-off state.

5 Claims, 6 Drawing Sheets

(51) Int. Cl.
  *B60R 16/03* (2006.01)
  *F02N 11/04* (2006.01)
  *B60L 58/12* (2019.01)

(56) References Cited

U.S. PATENT DOCUMENTS

2004/0112320 A1* 6/2004 Bolz .................. F02N 11/04
                                            123/179.28
2011/0198920 A1   8/2011 Komuro et al.

* cited by examiner

VEHICLE POWER SOURCE

CROSS-REFERENCE TO RELATED APPLICATIONS

The present application claims priority from Japanese Patent Application No. 2016-104502 filed on May 25, 2016, the entire contents of which are hereby incorporated by reference.

BACKGROUND

The technology relates to a vehicle power source mounted on a vehicle.

As an example of a vehicle power source mounted on a vehicle, a proposal has been put forward for a power source that causes regenerative power generation of a generator motor such as an integrated starter generator (ISG) in deceleration of a vehicle. For example, reference is made to Japanese Unexamined Patent Application Publication (JP-A) No. 2014-36557. The power source as described in JP-A No. 2014-36557 includes, as power storages, a lead battery and a lithium ion battery that are coupled in parallel with each other. This allows not only the lead battery but also the lithium ion battery to be charged with the regenerative power. Hence, it is possible to increase the regenerative power, leading to higher energy efficiency of the vehicle.

SUMMARY

Generally, in a power source, desired is stabilization of a power supply voltage. The stabilization of the power supply voltage is also expected in the vehicle power source as well.

It is desirable to provide a vehicle power source that makes it possible to stabilize a power supply voltage.

An aspect of the technology provides a vehicle power source including a generator motor, a first power storage, a second power storage, a conduction switch, and a switch controller. The generator motor is configured to be coupled to an engine. The first power storage is coupled to the generator motor. The second power storage is configured to be coupled, in parallel with the first power storage, to the generator motor. The conduction switch is subject to change between a conductive state and a cut-off state. The conductive state involves coupling the generator motor to the second power storage, and the cut-off state involves separating the generator motor from the second power storage. The switch controller configured to be change the conduction switch from the conductive state to the cut-off state, on a condition that the generator motor is controlled in a powered state. The switch controller configured to be change the conduction switch from the cut-off state to the conductive state, on a condition that the second power storage discharges in excess of a threshold, with the conductive switch changed to the cut-off state.

DETAILED DESCRIPTION

Figure 1:
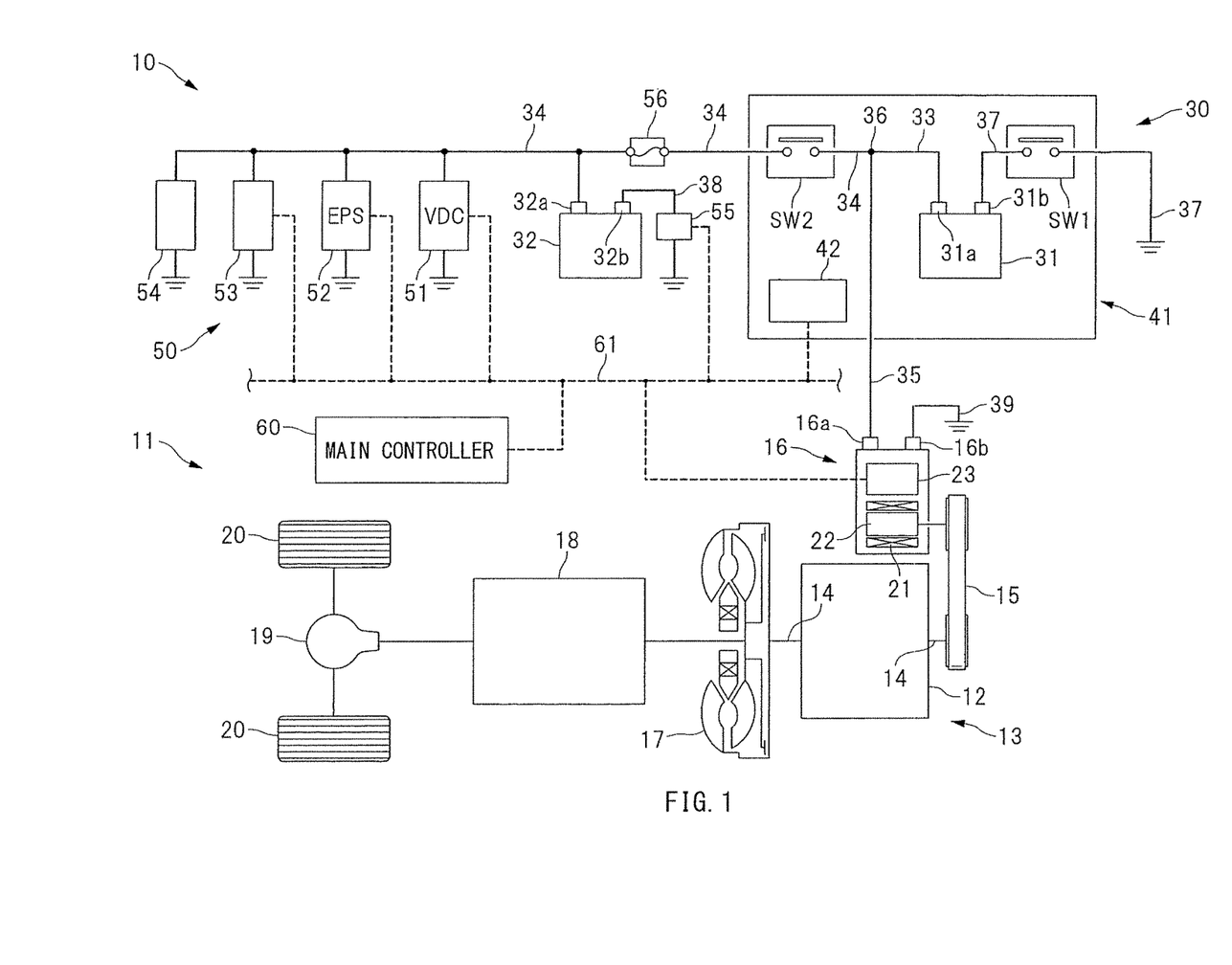
FIG. 1 schematically illustrates a configuration example of a vehicle including a vehicle power source according to one implementation of the technology.

In the following, some implementations of the technology are described with reference to the drawings. FIG. 1 schematically illustrates a configuration example of a vehicle 11 including a vehicle power source 10 according to one implementation of the technology. Referring to FIG. 1, the vehicle 11 may include a power unit 13. The power unit 13 may include an engine 12 that serves as a power source. The engine 12 may include a crank shaft 14 to which a starter generator 16 may be mechanically coupled through a belt mechanism 15. A transmission mechanism 18 may be also coupled to the engine 12 through a torque converter 17. One or more wheels 20 may be coupled to the transmission mechanism 18 through, for example but not limited to, a differential mechanism 19.

In one implementation of the technology, the starter generator 16 may serve as a "generator motor".

The starter generator 16 coupled to the engine 12 may be a so-called integrated starter generator (ISG) that serves as a generator and an electric motor. Not only may the starter generator 16 serve as the generator driven by the crank shaft 14, the starter generator 16 may also serve as the electric motor that causes starting revolution of the crank shaft 14 in a so-called idling stop control. The starter generator 16 may include a stator 21 and a rotor 22. The stator 21 may include a stator coil. The rotor 22 may include a field coil. The starter generator 16 may further include an ISG controller 23, in order to control energized states of the stator coil and the field coil. The ISG controller 23 may include an inverter, a regulator, a computer, and other parts. Allowing the ISG controller 23 to control the energized states of the field coil and the stator coil makes it possible to control, for example but not limited to, power generation torque and powering torque of the starter generator 16.

[Power Circuit]

Figure 2:
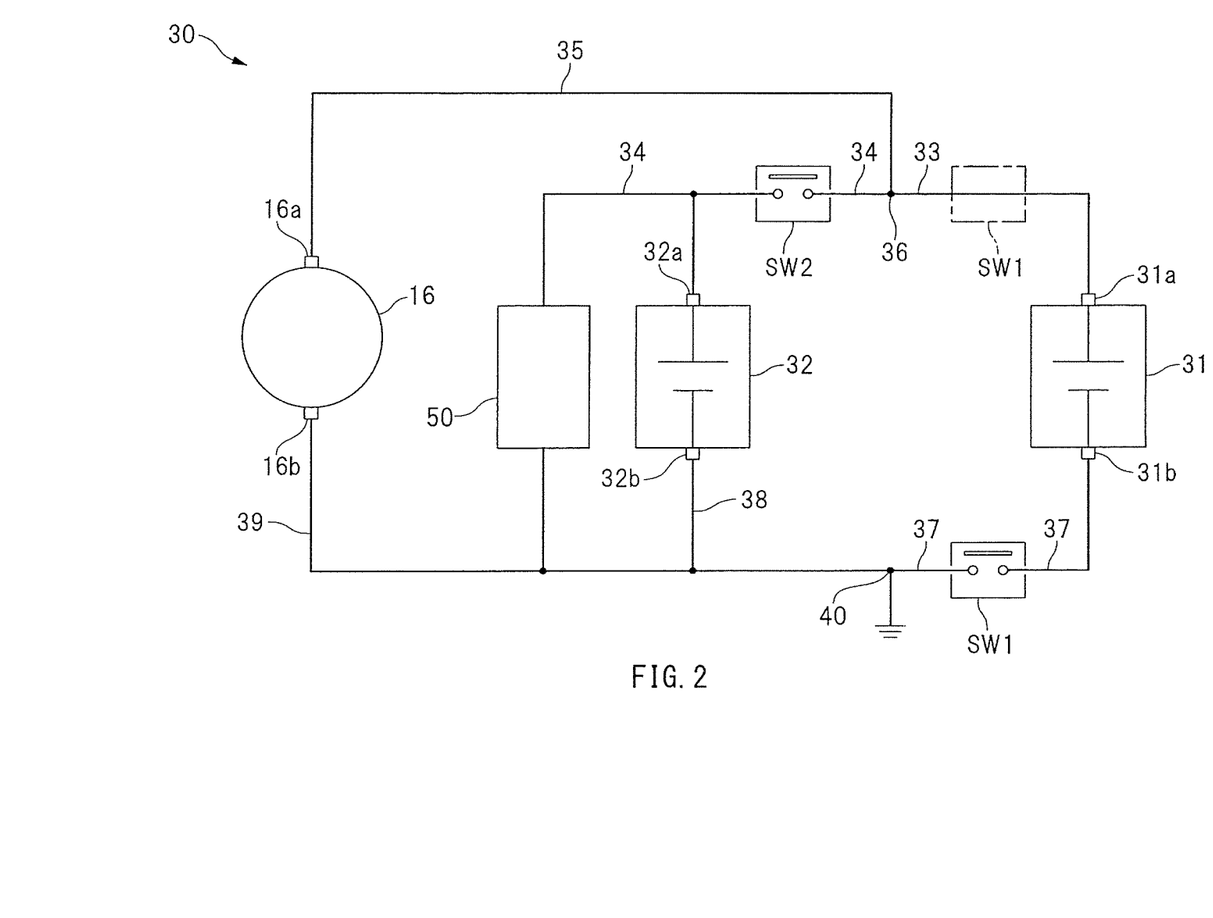
FIG. 2 is a circuit diagram of one example of a power circuit.

The vehicle power source 10 may include a power circuit 30, description of which is given below. FIG. 2 is a circuit diagram of one example of the power circuit 30. Referring to FIG. 2, the power circuit 30 may include a lithium ion battery 31 and a lead battery 32. The lithium ion battery 31 may be electrically coupled to the starter generator 16. The lead battery 32 may be electrically coupled, in parallel with the lithium ion battery 31, to the starter generator 16. It is to be noted that a terminal voltage of the lithium ion battery 31 may be designed to be higher than a terminal voltage of the lead battery 32, in order to positively cause discharge of the lithium ion battery 31. Moreover, internal resistance of the lithium ion battery 31 may be designed to be lower than internal resistance of the lead battery 32, in order to positively cause charge and the discharge of the lithium ion battery 31.

In one implementation of the technology, the lithium ion battery 31 may serve as a "first power storage". In one implementation of the technology, the lead battery 32 may serve as a "second power storage".

A positive electrode line 33 may be coupled to a positive electrode terminal 31*a* of the lithium ion battery 31. A positive electrode line 34 may be coupled to a positive electrode terminal 32*a* of the lead battery 32. A positive electrode line 35 may be coupled to a positive electrode terminal 16*a* of the starter generator 16. The positive electrode lines 33 to 35 may be coupled to one another through a connection point 36. Moreover, a negative electrode line 37 may be coupled to a negative electrode terminal 31*b* of the lithium ion battery 31. A negative electrode line 38 may be coupled to a negative electrode terminal 32*b* of the lead battery 32. A negative electrode line 39 may be coupled to a negative electrode terminal 16*b* of the starter generator 16. The negative electrode lines 37 to 39 may be coupled to a reference potential point 40.

A switch SW1 may be provided on the negative electrode line 37 of the lithium ion battery 31. The switch SW1 may be subject to change between a conductive state and a cut-off state. Controlling the switch SW1 to the conductive state allows for coupling of the starter generator 16 to the lithium ion battery 31. Controlling the switch SW1 to the cut-off state allows for separation of the starter generator 16 from the lithium ion battery 31. Moreover, a switch SW2 may be provided on the positive electrode line 34 of the lead battery 32. The switch SW2 may be subject to the change between the conductive state and the cut-off state. Controlling the switch SW2 to the conductive state allows for coupling of the starter generator 16 to the lead battery 32. Controlling the switch SW2 to the cut-off state allows for separation of the starter generator 16 from the lead battery 32. The switches SW1 and SW2 may each be a switch constituted by a semiconductor element such as a metal oxide semiconductor field effect transistor (MOSFET), or alternatively the switches SW1 and SW2 may each be a switch that causes a contact to mechanically open or close with use of, for example but not limited to, electromagnetic force. It is to be noted that the switches SW1 and SW2 may be also referred to as a relay or a contactor.

In one implementation of the technology, the switch SW2 may serve as a "conduction switch".

The power circuit 30 may include a battery module 41. Not only the lithium ion battery 31 but also the switches SW1 and SW2 may be incorporated in the battery module 41. The battery module 41 may further include a battery controller 42. The battery controller 42 may include, for example but not limited to, a computer. The battery controller 42 may have a function of monitoring, for example but not limited to, a state of charge (SOC), charge and discharge currents, the terminal voltage, and a cell temperature of the lithium ion battery 31. The battery controller 42 may also have a function of controlling the switches SW1 and SW2.

A group of electric loads 50 may be coupled to the positive electrode line 34 of the lead battery 32. The group of the electric loads 50 may include a plurality of electric loads. Non-limiting examples of the electric loads that constitute the group of the electric loads 50 may include a lateral slip prevention device 51, an electric power steering device 52, headlights 53, and an instrumental panel 54. The lateral slip prevention device 51 may stabilize a traveling posture of the vehicle. The electric power steering device 52 may assist a driver with a steering operation. The headlights 53 may send light forward of the vehicle. The instrumental panel 54 may provide an occupant with display of various pieces of information. Among the electric loads as exemplified above, the lateral slip prevention device 51, the electric power steering device 52, and the headlights 53 may each be a large-capacity device whose power consumption is larger than a predetermined electric power threshold. It is to be note that the large-capacity device having large power consumption is not limited to the devices as exemplified above. For example, devices such as a heater blower, a positive temperature coefficient (PTC) heater, and an electric heater may also exemplify the large-capacity device.

In one implementation of the technology, the large-capacity device may serve as a "large-capacity load".

In addition, although undepicted, various controllers such as the ISG controller 23, the battery controller 42, and a main controller 60 described later may be coupled, as the electric loads, to the positive electrode line 34 of the lead battery 32. In other words, the controllers 23, 42, and 60 may each be provided as one of the electric loads that constitute the group of the electric loads 50. Moreover, a battery sensor 55 may be provided on the negative electrode line 38 of the lead battery 32. The battery sensor 55 may have a function of detecting a charge current, a discharge current, the terminal voltage, and the state of charge SOC of the lead battery 32. It is to be noted that a fuse 56 may be provided on the positive electrode line 34. The fuse 56 may protect, for example but not limited to, the group of the electric loads 50.

[Battery Charge and Discharge Control]

Description is given of a charge and discharge control of the lithium ion battery 31. The vehicle power source 10 may include the main controller 60, in order to control the charge and the discharge of the lithium ion battery 31. The main controller 60 may include, for example but not limited to, a computer. The main controller 60 and the controllers 23 and 42 as mentioned above may be coupled to one another in a communicable way through an on-vehicle network 61 such as a controller area network (CAN) and a local interconnect network (LIN). The main controller 60 may control, on the basis of the state of charge SOC of the lithium ion battery 31, the starter generator 16 to a power generation state or a power generation suspension state, and thereby control the charge and the discharge of the lithium ion battery 31. It is to be noted that the state of charge SOC refers to a ratio of an amount of charged power to a designed capacity of a battery. The state of charge SOC may be transmitted to the main controller 60 from the battery controller 42.

Figure 3:
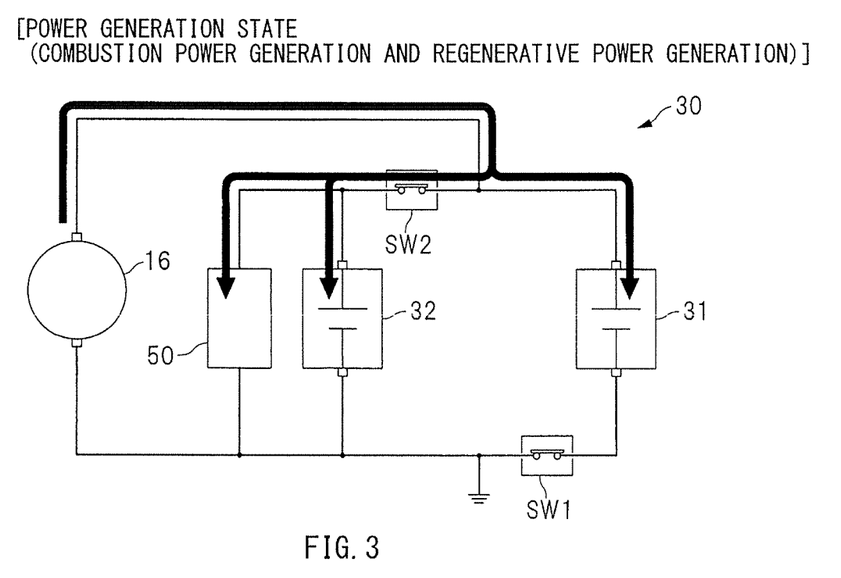
FIG. 3 is a diagram of a power supply state, in a case with a starter generator controlled to a power generation state.
Figure 4:
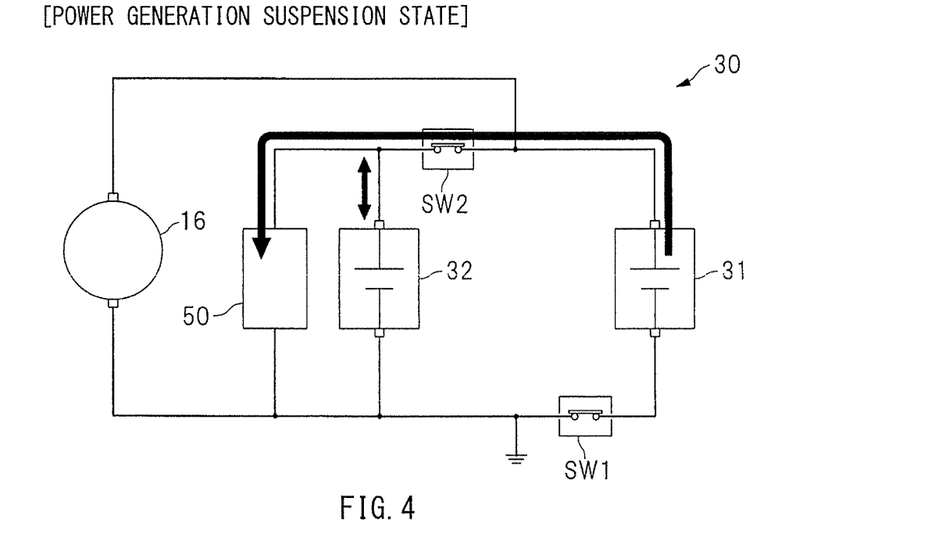
FIG. 4 is a diagram of the power supply state, in a case with the starter generator controlled to a power generation suspension state.

FIG. 3 illustrates a power supply state, in a case with the starter generator 16 controlled to the power generation state. FIG. 4 illustrates the power supply state, in a case with the starter generator 16 controlled to the power generation suspension state. It is to be noted that the power generation state of the starter generator 16 may include a combustion power generation state and a regenerative power generation state. The combustion power generation state may involve rotation drive of starter generator 16 with engine power. The regenerative power generation state may involve the rotation drive of the starter generator 16 with kinetic energy in deceleration of the vehicle.

As illustrated in FIG. 3, for example, in a case with exhaustion of the amount of the charged power of the lithium ion battery 31, the starter generator 16 may be controlled to the combustion power generation state. In other words, in a case in which the state of charge SOC of the lithium ion battery 31 is lower than a predetermined lower limit value, the starter generator 16 may be controlled to the combustion power generation state, in order to charge the lithium ion battery 31 and to increase the state of charge SOC. In controlling the starter generator 16 to the combustion power generation state, a power generation voltage of the starter generator 16 may be raised to a value higher than the terminal voltage of the lithium ion battery 31. This causes power supply from the starter generator 16 to, for example but not limited to, the lithium ion battery 31, the group of the electric loads 50, and the lead battery 32, as indicated by a black arrow in FIG. 3. Thus, the lithium ion battery 31 may be charged by the starter generator 16.

As illustrated in FIG. 4, for example, in a case with the sufficient amount of the charged power of the lithium ion battery 31, the starter generator 16 may be controlled to the power generation suspension state. In other words, in a case in which the state of charge SOC of the lithium ion battery 31 is higher than a predetermined upper limit value, the starter generator 16 may be controlled to the power generation suspension state, in order to promote the discharge of the lithium ion battery 31 to reduce a load on the engine. In controlling the starter generator 16 to the power generation suspension state, the power generation voltage of the starter generator 16 may be lowered to a value lower than the terminal voltage of the lithium ion battery 31. This causes power supply from the lithium ion battery 31 to the group of the electric loads 50, as indicated by a black arrow in FIG. 4. Hence, it is possible to restrain the power generation of the starter generator 16, and to reduce the load on the engine.

As described, the starter generator 16 may be controlled to the combustion power generation state or the power generation suspension state on the basis of the state of charge SOC. Meanwhile, in the deceleration of the vehicle, the starter generator 16 may be controlled to the regenerative power generation state in terms of enhancement in fuel consumption performance of the vehicle 11. This makes it possible to convert the kinetic energy of the vehicle 11 to electric energy and to recover the electric energy, leading to enhancement in energy efficiency of the vehicle 11. Determination on whether or not to execute the regenerative power generation of the starter generator 16 may be made on the basis of, for example but not limited to, an operation state of an accelerator pedal or a brake pedal, or both. For example, in a case with a release of stepping down of the accelerator pedal, or in a case with stepping down of the brake pedal, the power generation voltage of the starter generator 16 may be raised to the value higher than the terminal voltage of the lithium ion battery 31. Thus, as illustrated in FIG. 3, the starter generator 16 may be controlled to the regenerative power generation state. It is to be noted that as illustrated in FIGS. 3 and 4, the switches SW1 and SW2 may be maintained in the conductive state, while the starter generator 16 is controlled to the combustion power generation state, the regenerative power generation state, and the power generation suspension state.

[Switch Opening and Closing Control]

Figure 5:
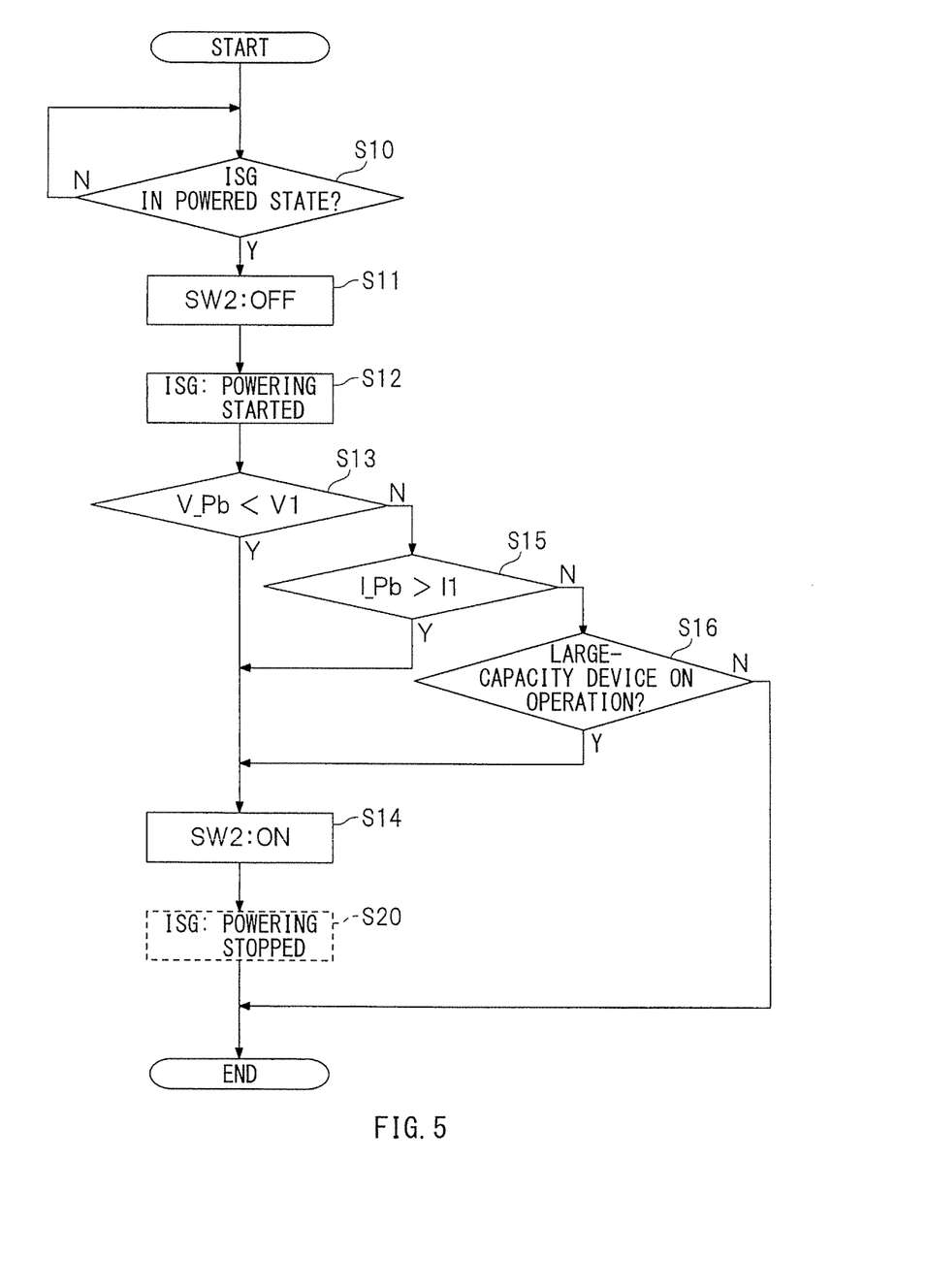
FIG. 5 is a flow chart of one example of a procedure of execution of a switch opening and closing control.
Figure 6A:
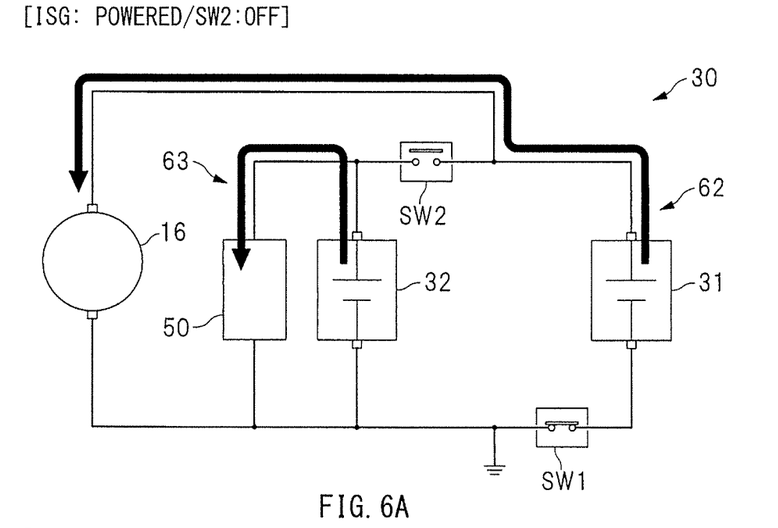
FIG. 6A is a diagram of the power supply state in a process of the execution of the switch opening and closing control.
Figure 6B:
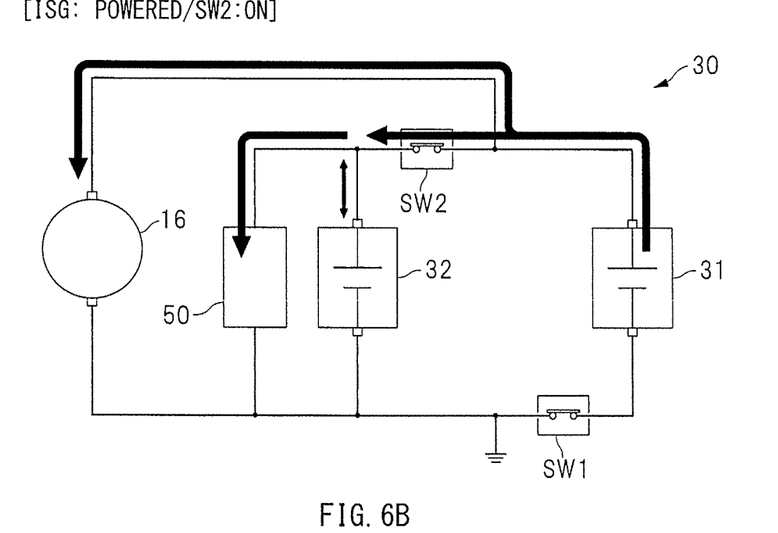
FIG. 6B is a diagram of the power supply state in the process of the execution of the switch opening and closing control.

The main controller 60 may execute an opening and closing control of the switch SW2, description of which is given below. FIG. 5 is a flow chart of one example of a procedure of execution of the switch opening and closing control. FIGS. 6A and 6B each illustrate the power supply state in a process of the execution of the switch opening and closing control. In FIGS. 5, 6A, and 6B, the conductive state of the switch SW2 is denoted by "ON", and the cut-off state of the switch SW2 is denoted by "OFF". In FIGS. 5, 6A, and 6B, the starter generator 16 is referred to as "ISG". It is to be noted that as illustrated in FIG. 1, the battery controller 42, the battery sensor 55, the lateral slip prevention device 51, the electric power steering device 52, and the headlights 53 may be coupled to the main controller 60 through the on-vehicle network 61 in the communicable way.

In one implementation of the technology, the main controller 60 may serve as a "switch controller".

As illustrated in FIG. 5, in step S10, determination may be made on whether or not the situation is that the starter generator 16 is to be controlled to a powered state. The situation that the starter generator 16 is to be controlled to the powered state may be a situation that involves allowing the starter generator 16 to cause starting revolution of the engine 12 at a restart of the engine, or a situation that involves allowing the starter generator 16 to provide assistance drive of the engine 12 at a start of the vehicle.

In step S10, when the determination is made that the situation is that the starter generator 16 is to be controlled to the powered state (Y in step S10), the flow may proceed to step S11. In step S11, the switch SW2 may be changed from the conductive state to the cut-off state. In subsequent step S12, the starter generator 16 may be controlled to the powered state.

As described, in controlling the starter generator 16 to the powered state, the switch SW2 may be changed from the conductive state to the cut-off state. As illustrated in FIG. 6A, changing the switch SW2 to the cut-off state causes separation of a power circuit 62 and a power circuit 63 from each other. The power circuit 62 may include the lithium ion battery 31 and the starter generator 16. The power circuit 63 may include the lead battery 32 and the group of the electric loads 50. Accordingly, as indicated by a black arrow in FIG. 6A, the group of the electric loads 50 may be supplied with power from the lead battery 32 even in a case with an increase in current consumption of the starter generator 16. This allows for prevention of an instantaneous voltage drop with respect to the group of the electric loads 50. It is therefore possible to control the vehicle 11 without giving a sense of uncomfortableness to the occupant.

As illustrated in FIG. 5, in step S12, the starter generator 16 may be controlled to the powered state. Thereafter, the flow may proceed to step S13. In step S13, determination may be made on whether or not the terminal voltage V_Pb of the lead battery 32 is lower than a predetermined voltage threshold V1. In step S13, when the determination is made that the terminal voltage V_Pb is lower than the voltage threshold V1 (Y in step S13), the flow may proceed to step S14. In step S14, the switch SW2 may be changed from the cut-off state to the conductive state. Here, the situation that the terminal voltage V_Pb is lower than the voltage threshold V1 may be a situation that power supplied from the lead battery 32 to the group of the electric loads 50 increases, i.e., a situation that the lead battery 32 discharges in excess of a predetermined threshold. Accordingly, as illustrated in FIG. 6B, the switch SW2 may be changed from the cut-off state to the conductive state, allowing the lithium ion battery 31 to be coupled to the group of the electric loads 50. In other words, as indicated by a black arrow in FIG. 6B, it is possible to supply power from the lithium ion battery 31 to the group of the electric loads 50, and to restrain excessive discharge of the lead battery 32. This makes it possible to stabilize the power supply voltage of the vehicle power source 10, allowing for normal functioning of the group of the electric loads 50.

In step S13, when the determination is made that the terminal voltage V_Pb of the lead battery 32 is equal to or higher than the voltage threshold V1 (N in step S13), the flow may proceed to step S15. In step S15, determination may be made on whether or not the discharge current I_Pb of the lead battery 32 is higher than a predetermined current threshold I1. In step S15, when the determination is made that the discharge current I_Pb is higher than the current threshold I1 (Y in step S15), the flow may proceed to step S14. In step S14, the switch SW2 may be changed from the cut-off state to the conductive state. Here, the situation that the discharge current I_Pb is higher than the current threshold I1 may be the situation that the power supplied from the lead battery 32 to the group of the electric loads 50 increases, i.e., the situation that the lead battery 32 discharges in excess of the predetermined threshold. Accordingly, as illustrated in FIG. 6B, the switch SW2 may be changed from the cut-off state to the conductive state, causing the lithium ion battery 31 to be coupled to the group of the electric loads 50. In other words, as indicated by the black arrow in FIG. 6B, it is possible to supply power from the lithium ion battery 31 to the group of the electric loads 50, and to restrain the excessive discharge of the lead battery 32. It is therefore possible to stabilize the power supply voltage of the vehicle power source 10, allowing for the normal functioning of the group of the electric loads 50.

In step S15, when the determination is made that the discharge current I_Pb of the lead battery 32 is equal to or lower than the current threshold I1 (N in step S15), the flow may proceed to step S16. In step S16, determination may be made on whether or not the large-capacity device 51, 52, or 53, or any combination thereof, is on operation. The large-capacity devices 51 to 53 may have large power consumption. In step S16, when the lateral slip prevention device 51, the electric power steering device 52, or the headlights 53, or any combination thereof, is on operation, among the electric loads that constitute the group of the electric loads 50 (Y in step S16), the flow may proceed to step S14. In step S14, the switch SW2 may be changed from the cut-off state to the conductive state. Here, the situation that the large-capacity device such as the lateral slip prevention device 51 is on operation may be a situation that an increase in the power consumption of the group of the electric loads 50 is predictable, i.e., a situation that the discharge of the lead battery 32 in excess of the predetermined threshold is predictable. Accordingly, as illustrated in FIG. 6B, before a significant change in the terminal voltage V_Pb or the discharge current I_Pb of the lead battery 32, the switch SW2 may be changed from the cut-off state to the conductive state, causing the lithium ion battery 31 to be coupled to the group of the electric loads 50. This makes it possible to supply power from the lithium ion battery 31 to the group of the electric loads 50, as indicated by the black arrow in FIG. 6B. Hence, it is possible to stabilize the power supply voltage of the vehicle power source 10.

In step S16, when the determination is made that all the large-capacity devices 51 to 53 are stopped (N in step S16), the routine may be finished without changing the switch SW2 to the conductive state. In other words, when in step S13 the terminal voltage V_Pb is determined as being high (N in step S13), in step S15 the discharge current I_Pb is determined as being low (N in step S15), and in step S16 all the large-capacity devices 51 to 53 are determined as being stopped (N in step S16), the situation is that the lead battery 32 is unlikely to discharge at a large current. Accordingly, the switch SW2 may be maintained in the cut-off state.

It is to be noted that there may be a case in which in step S14, the switch SW2 may be changed to the conductive state, and thereafter, the excessive discharge of the lead battery 32 may be eliminated, and powering of the starter generator 16 may be continued. In such a case, as illustrated in FIG. 6A, the switch SW2 may be changed again from the conductive state to the cut-off state. In this case, in one preferable but non-limiting example, determination on a discharge state of the lead battery 32 may be made using a threshold different from the thresholds V1 and I1 as mentioned above, in order to avoid hunting of the switch SW2.

In the forgoing description, when the lead battery 32 discharges in excess of the predetermined threshold, the switch SW2 may be changed from the cut-off state to the conductive state, allowing for stabilization of the power supply voltage to the group of the electric loads 50. However, this is non-limiting. In one specific but non-limiting example, as indicated in step S20 presented by broken lines in FIG. 5, while the switch SW2 may be changed from the cut-off state to the conductive state, the powered state of the starter generator 16 may be stopped. In one specific but non-limiting example, in a case in which the starter generator 16 is allowed to provide the assistance drive of the engine 12 at the start of the vehicle, the assistance drive by the starter generator 16 may be stopped. This makes it possible to supply more power from the lithium ion battery 31 to the group of the electric loads 50. It is therefore possible to stabilize the power supply voltage of the vehicle power source 10 even in the case with the significant increase in the power consumption of the group of the electric loads 50. It should be appreciated that more power may be supplied from the lithium ion battery 31 to the group of the electric loads 50, by lowering the powering torque of the starter generator 16 and thereby restraining power consumption.

As described, in the vehicle power source 10, the switch SW2 may be changed from the cut-off state to the conductive state, in the case with the increase in the power supplied from the lead battery 32 to the group of the electric loads 50, or in the case in which the increase in the power consumption by the group of the electric loads 50 is predictable. Hence, in the vehicle power source 10, it is possible to stabilize the power supply voltage, leading to the normal functioning of the group of the electric loads 50.

Specifically, to the vehicle power source device 10, coupled are electric loads such as various actuators and controllers. Power consumption of the electric loads has a tendency to increase year by year. Accordingly, the power supply voltage of the vehicle power source 10 may have an instantaneous and significant drop, depending on operation states of the electric loads. Such a significant drop of the power supply voltage may be a cause of instability of operation of, for example, the controllers and indicators, and a cause of excessive discharge of, for example, the lead battery.

In the vehicle power source 10, it is possible to stabilize the power supply voltage, as described above, leading to the normal functioning of the group of the electric loads 50. In particular, in the vehicle power source 10, as described above, the switch SW2 may be further changed from the cut-off state to the conductive state, in the case in which the switch SW2 is changed from the conductive state to the cut-off state in controlling the starter generator 16 to the powered state. Hence, in the vehicle power source 10, it is also possible to stabilize the power supply voltage, in the case with the starter generator 16 controlled to the powered state. As a result, it is possible to allow the group of the electric loads 50 to function normally.

The technology is by no means limited to the implementations described above. It should be appreciated that modifications and alterations may be made without departing from the scope of the subject matter of the technology. In the forgoing description, the lithium ion battery 31 may be adopted as the "first power storage", and the lead battery 32 may be adopted as the "second power storage". However, this is non-limiting. Other kinds of batteries or capacitors may be adopted. Moreover, it should be appreciated that the "first power storage" and the "second power storage" are not limited to power storages of different kinds, but may be power storages of the same kind. Furthermore, in the forgoing description, the starter generator 16, i.e., the ISG may be adopted as the "generator motor". However, this is non-limiting. A motor generator that serves as a power source of a hybrid vehicle may be adopted as the "generator motor".

In the forgoing description, in steps S13 and S15, the determination may be made on the terminal voltage V_Pb and the discharge current I_Pb in order to make a determination on the situation that the lead battery 32 discharges in excess of the predetermined threshold. However, this is non-limiting. In one alternative example, the determination may be made on the situation of the excessive discharge of the lead battery 32 solely on the basis of the terminal voltage V_Pb. In another alternative, the determination may be made on the situation of the excessive discharge of the lead battery 32 solely on the basis of the discharge current I_Pb.

In the forgoing description, the main controller 60 may serve as the "switch controller". However, this is non-limiting. Another controller or other controllers such as the battery controller 42 may serve as the "switch controller". Moreover, in the forgoing description, the switch SW1 may be provided on the negative electrode line 37 of the lithium ion battery 31. However, this is non-limiting. In one alternative example, the switch SW1 may be provided on the positive electrode line 33 of the lithium ion battery 31, as denoted by a dash-single-dot line in FIG. 2.

In one implementation described above, the main controller 60 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the main controller 60. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle power source, comprising:
   a generator motor configured to be coupled to an engine;
   a first power storage configured to be coupled to the generator motor;
   a second power storage configured to be coupled, in parallel with the first power storage, to the generator motor, the second power storage further being coupled to one or more electric loads;
   a conduction switch subject to change between a closed state and an open state, wherein, in the closed state, the generator motor is coupled to the second power storage, and, in the open state, the generator motor is separated from the second power storage; and
   a switch controller configured to change the conduction switch from the closed state to the open state when the generator motor is controlled in a powered state, wherein
      the switch controller changes the conduction switch from the open state to the closed state when the second power storage discharges in excess of a threshold with the conduction switch in the open state,
      the switch controller changes the conduction switch from the open state to the closed state during an operation of the one or more electric loads, and
      the switch controller controls a state of operation of the generator motor based on a state of charge of the first power storage and with the conduction switch in the closed state.

2. The vehicle power source according to claim 1, wherein the second power storage discharges in excess of the threshold during at least one of a discharge current of the second power storage is higher than a current threshold, and a terminal voltage of the second power storage is lower than a voltage threshold.

3. The vehicle power source according to claim 1, wherein internal resistance of the first power storage is lower than internal resistance of the second power storage.

4. The vehicle power source according to claim 2, wherein internal resistance of the first power storage is lower than internal resistance of the second power storage.

5. A vehicle power source, comprising:
   a generator motor configured to be coupled to an engine;
   a first power storage configured to be coupled to the generator motor;
   a second power storage configured to be coupled, in parallel with the first power storage, to the generator motor, the second power storage further being coupled to one or more electric loads;
   a conduction switch subject to change between a closed state and an open state, wherein, in the closed state, the generator motor is coupled to the second power storage, and, in the open state, the generator motor is separated from the second power storage; and
   a switch controller configured to change the conduction switch from the closed state to the open state when the generator motor is controlled in a powered state, wherein, in the powered state, the generator motor operates the engine, and wherein
      the switch controller changes the conduction switch from the open state to the closed state when the second power storage discharges in excess of a threshold with the conduction switch in the open state,
      the switch controller controls a state of operation of the generator motor based on a state of charge of the first power storage and with the conduction switch in the closed state, and the switch controller changes the conduction switch from the open state to the closed state during an operation of the one or more electric loads.

\* \* \* \* \*